Dec. 16, 1947. M. A. LACEY 2,432,526
TIRE PRESSURE INDICATOR
Filed May 22, 1945

INVENTOR.
Molan A. Lacey.
BY
ATTORNEYS

Patented Dec. 16, 1947

2,432,526

UNITED STATES PATENT OFFICE 2,432,526

TIRE PRESSURE INDICATOR

Molan A. Lacey, Oakland, Calif.

Application May 22, 1945, Serial No. 595,116

4 Claims. (Cl. 200—58)

The present invention relates to new and useful improvements in tire pressure indicators, and more particularly to a device for indicating to the driver of a vehicle when one of the tires thereof drops below a certain predetermined pressure.

A further object of the invention is to provide an indicator embodying a signal lamp on the instrument panel of the vehicle and included in an electric circuit with a switch device carried by each of the wheels of the vehicle and arranged to be closed upon a predetermined deflation of the tires.

Another object of the invention is to provide adjustable means associated with the device and in which the closing movement for the switch can be varied in accordance with a desired pressure condition.

Another object of the invention is to provide a device of this character of simple and practical construction, which is efficient and reliable in operation, relatively inexpensive to manufacture and install in operative position on the wheel of a vehicle, and which is otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
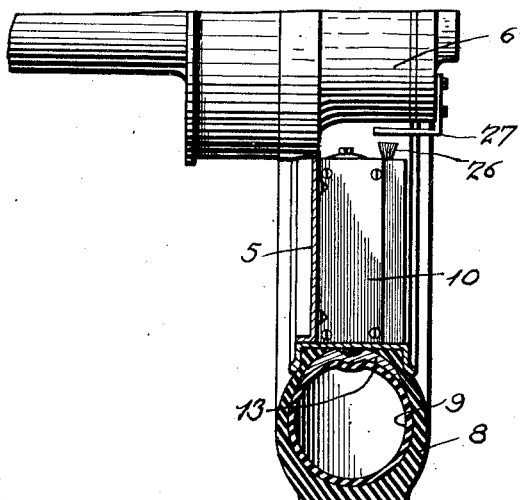
Figure 1 is a transverse sectional view of a vehicle wheel showing the tire-deflation signalling device mounted thereon.
Figure 2:
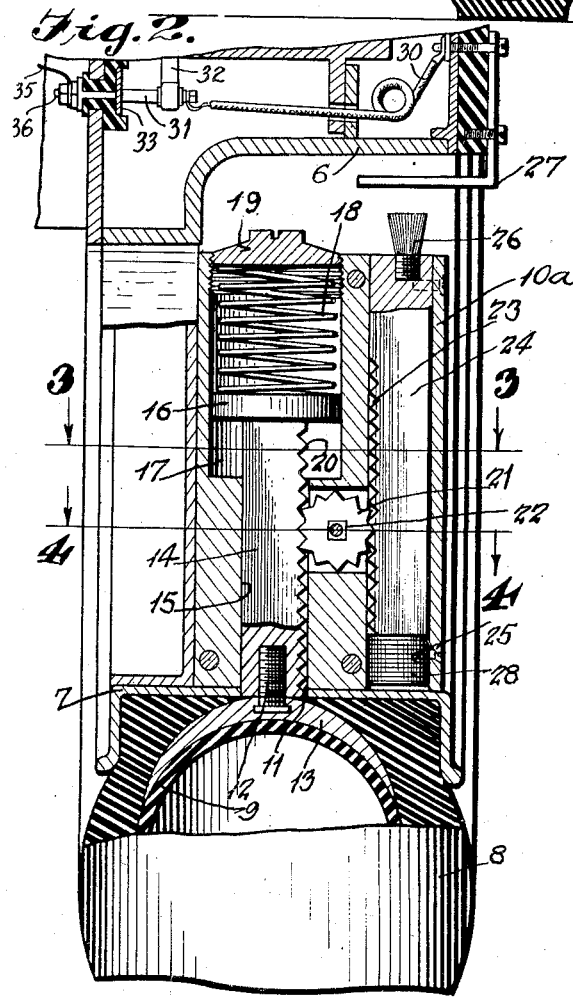
Figure 2 is an enlarged vertical sectional view of the signalling device.
Figure 3:
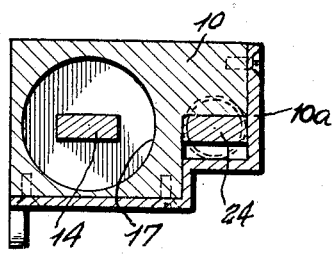
Figure 4:
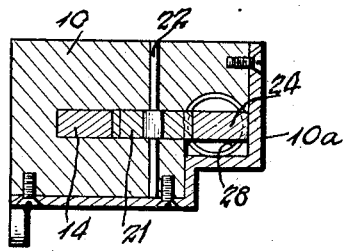

Figures 3 and 4 are transverse sectional views taken respectively on the lines 3—3 and 4—4 of Figure 2.

Referring now to the drawing in detail, wherein for the purpose of illustration I have shown a preferred embodiment of the invention, the numeral 5 designates a vehicle wheel of conventional construction and including a hub 6 and rim 7 on which a pneumatic tire 8 is mounted, the tire including the usual inner tube 9.

A switch housing 10 is secured at the outer surface of the wheel 5 to the inside of the rim 7, the rim having an opening 11 through which a screw 12 freely works, the screw having a pad 13 secured at its outer end and positioned at the side of the inner tube 9 adjacent the rim, the pad conforming to the curvature of the inner tube and the tire casing.

The screw 12 is threaded upwardly into the lower end of a rack bar 14 which is slidably mounted in a passage 15 in the housing 10, the upper end of the rack bar being formed with a head 16 working in a chamber 17 in the upper portion of the housing and yieldably urged downwardly by means of a coil spring 18 positioned in the chamber above the head and secured in position in the chamber by means of a threaded plug 19, the plug providing means for adjusting the tension of the spring.

One edge of the rack bar 14 is formed with rack teeth 20 engaging a pinion 21 journaled on a pin 22 in the housing 10, the pinion also engaging the teeth 23 of a second rack bar 24 slidably mounted in a chamber 25 in the housing and at a side of the pinion opposite from the rack bar 14.

The rack bar 24 extends upwardly through the top of the housing and a metallic bristle brush 26 is threaded in the upper end of said bar. A coil spring 28 is also positioned in the chamber 25 behind the rack bar 24 to assist in the outward movement thereof.

A contact arm 27 is secured to the outer end of the hub 6 and extends longitudinally inwardly thereof at one side of the hub and in the path of the outward sliding movement of the brush 26 on the outer end of the rack bar 24, the bristles of the brush assisting to keep the contact clean. The contact arm 27 is connected by an insulated wire 30 to an insulated brush 31 carried by a metal band 32 attached to the wheel hub 6. The brush 31 is in contact with an armature disk 33 carried by the wheel, the positive wire 35 from the lamp being connected to the disk 33 by means of a binding post 36.

In the operation of the device, when the tire 8 is inflated at a normal pressure, the inner tube 9 will force the pad 13 against the rim 7, thereby maintaining the rack bar 14 upwardly in the housing 10 against the tension of the spring 18.

Upon a decrease in the pressure of the tire, the spring 18 will force the rack bar 14 downwardly, as shown in Figure 2 of the drawing, or radially outwardly with respect to the wheel, thereby rotating the pinion 21 and causing a radial inward movement of the rack bar 24 so as to move the brush 26 into contact with the contact arm 27.

Accordingly, by connecting the contact arm 27 with an electric lamp (not shown) at the instrument panel of the vehicle, in a conventional manner, the lamp will be energized upon a closing of the switch composed of the brush 26 and contact arm 27 and thus indicate to the driver a predetermined decrease in the pressure of the tire. The housing 10 is provided with a removable plate 10a by means of which the rack bar 24 may be adjusted relative to the pinion 21.

It will be understood that each of the four wheels of the vehicle is provided with one of the switch mechanisms heretofore described, and including a lamp mounted on the instrument panel so that a deflation signal for each of the tires will be provided.

It is believed the details of construction, advantages and manner of use of the device will be readily understood from the foregoing without further detailed explanation.

Having thus described the invention, what is claimed is:

1. A tire deflation indicator comprising a stationary contact adapted for attaching to the hub of a vehicle wheel, said wheel including a pneumatic tire mounted thereon and provided with an inner tube, a housing carried by the wheel, a spring-loaded pad yieldably held in engagement with the inner tube, a contact brush, and rack and pinion means connecting the brush with the pad and openable upon a deflating movement of the tire to move the brush toward the stationary contact.

2. A tire deflation indicator comprising a stationary contact adapted for attaching to the hub of a vehicle wheel, said wheel including a pneumatic tire mounted thereon and provided with an inner tube, a housing carried by the wheel, a pair of rack bars slidably mounted in parallel relation in the housing, a pinion operatively connecting the rack bars for opposite movement, a pad carried by one of the rack bars and disposed in engagement with the inner tube, spring means urging the pad against the inner tube, and a contact brush carried by the other rack bar and movable toward the stationary contact upon a predetermined deflating movement of the tire.

3. A tire deflating indicator comprising a stationary contact adapted for attaching to the hub of a vehicle wheel, said wheel including a pneumatic tire mounted thereon and provided with an inner tube, a housing carried by the wheel, a pair of rack bars slidably mounted in parallel relation in the housing, a pinion operatively connecting the rack bars for opposite movement, a pad carried by one of the rack bars and disposed in engagement with the inner tube, spring means urging the rack bars in a direction for forcing the pad against the inner tube, and a contact brush carried by the other of said rack bars and movable toward the stationary contact upon a predetermined deflating movement of the tire.

4. A tire deflating indicator comprising a stationary contact adapted for attaching to the hub of a vehicle wheel, said wheel including a pneumatic tire mounted thereon and provided with an inner tube, a housing carried by the wheel, a pair of rack bars slidably mounted in parallel relation in the housing, a pinion operatively connecting the rack bars for opposite movement, a pad carried by one of the rack bars and disposed in engagement with the inner tube, a coil spring behind said one rack bar for urging the pad against the inner tube, means for adjusting the tension of said coil spring, and a contact brush carried by the other of said rack bars and movable toward the stationary contact upon a predetermined deflating movement of the tire.

MOLAN A. LACEY.

REFERENCES CITED

The following references are of record in the file of this patent:

UNITED STATES PATENTS

| Number | Name | Date |
| --- | --- | --- |
| 2,090,184 | Card | Aug. 17, 1937 |
| 2,147,512 | Asanuma | Feb. 14, 1939 |
| 2,199,032 | Stoddard | Apr. 30, 1940 |